Feb. 22, 1966     D. J. TESTON     3,236,258
ANEROID CONTROLLED REGULATOR
Filed March 5, 1964
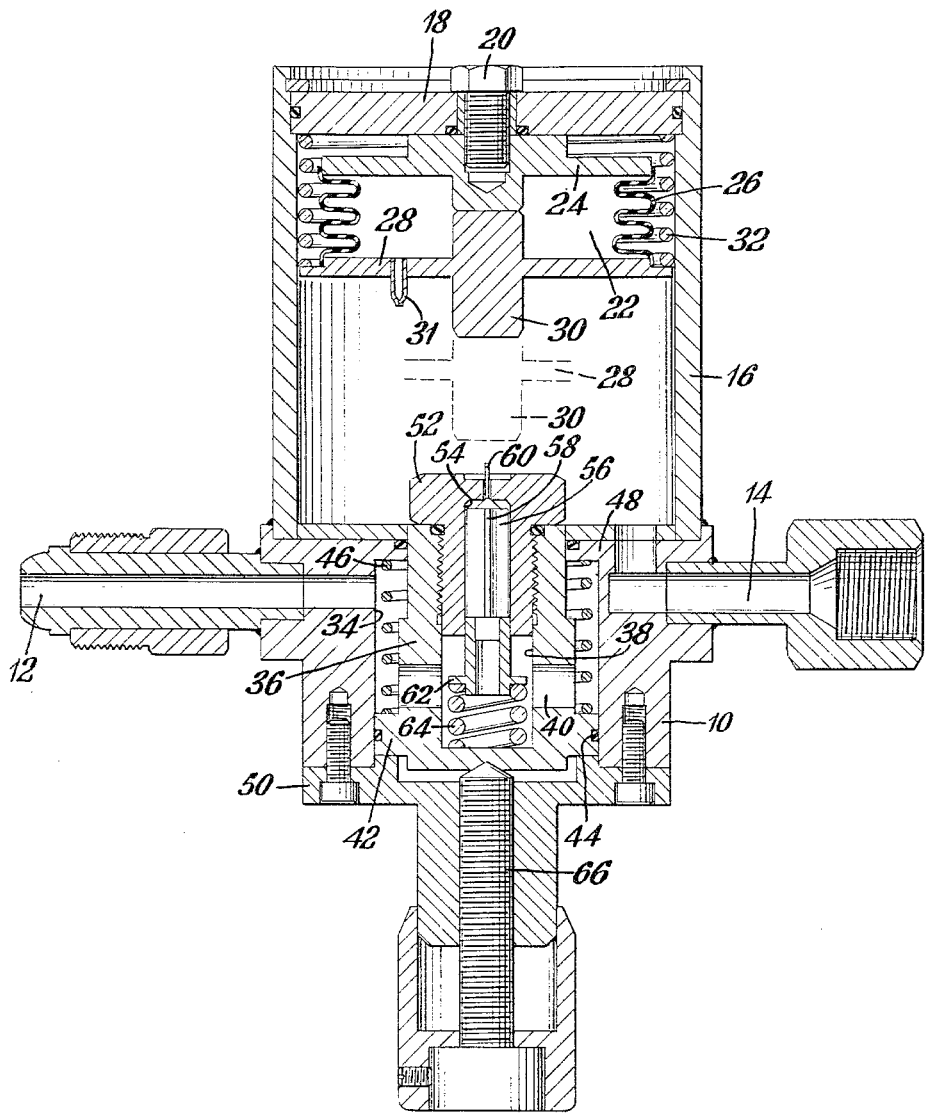
INVENTOR.
DAVID J. TESTON
BY Richard S. Shrere, Jr.
ATTORNEY 3,236,258
ANEROID CONTROLLED REGULATOR
David J. Teston, Cranford, N.J., assignor to Union
Carbide Corporation, a corporation of New York
Filed Mar. 5, 1964, Ser. No. 349,699
3 Claims. (Cl. 137—510)

This invention relates to aneroid controlled regulators for reducing high primary pressures (up to 165 p.s.i.a.) from a source of compressed gas used for purging or shielding and for controlling these high pressures to lower sub-atmospheric absolute outlet pressures, particularly those induced by a vacuum pump.

The main objects of the invention are to provide an aneroid controlled regulator embodying an evacuated bellows which is not subject to atmospheric pressure, to provide interchangeable bellows or helper springs for different pressure or temperature ranges, to adjust the setting of the regulator without moving the bellows rotationally, and to provide an anti-friction floating mounting for the movable parts of the bellows.

According to the invention, an evacuated bellows is mounted in a housing secured to a regulator body and provided with a valve operating plunger. The body has a central bore with a valve seat at the top thereof, and a valve in the bore spring pressed toward the seat, with a stem passing therethrough and engaged by the plunger, to open the valve when pressure drop in the housing expands the bellows. Preferably, an adjustment screw is mounted in the bottom of the body to set the valve spring pressure. The bellows preferably has a stationary mounting plate in the top of the housing, and the screw moves the valve and valve seat axially of the body bore toward the stationary mounting. Preferably, the bellows comprises a plunger plate with an annularly corrugated diaphragm sealed between said plunger plate and said stationary mounting plate for friction-free floating of the plunger plate in the housing.

In the drawing, the single figure is an axial section through a regulator according to the preferred embodiment of the present invention.

The regulator shown comprises a body 10 having an inlet 12 and an outlet 14 leading, for example, to a vacuum pump (not shown). Mounted on top of the body 10 is a bellows housing 16 having a lid 18 removably sealed in the top of the housing.

Secured to the lid 18 by a screw 20 is an evacuated bellows 22 comprising base plate 24 having the top of a concentric annularly corrugated diaphragm 26 marginally sealed thereto. The bottom of the diaphragm is marginally sealed to a plunger plate 28 for freely floating axially inside of the housing 16, and carrying a valve operating plunger 30. The assembled bellows is evacuated through a sealing tip 31.

Between the outer rims of the lid 18 and the plunger plate 28 and outside of the diaphragm 26 and base plate 24 is mounted a helped spring 32. When the lid 18 is removed, the bellows 22 is carried out thereby, and when the screw 20 is removed, the helper spring can be interchanged or the bellows replaced and reassembled by the screw 20.

The body 10 has a central bore 34 which receives a cartridge comprising a cylinder 36 having a central bore 38 and a transverse bore 40 above a base flange 42. This cartridge is slidably mounted in the body bore 34 and the base flange 42 is sealed by an O ring 44.

The cylinder 36 is of smaller diameter than the bore 34 to receive a coil compression spring 46 bearing on an internal flange 48 of the body 10. The spring 46 bears on the top of the base flange 42 which rests on a cover 50 for the body bore 34.

Screwed into the top of the cylinder 36 is a valve seat 52 having a central bore 54 receiving a hollow valve 56 having flutes 58 sliding in the bore 54, and a stem 60 passing up through the seat 52. The hollow valve 56 has a flange 62 on which bears a coil compression spring 64 seated in the bottom of the bore 38 into the base flange 42. An adjustment screw 66 threaded in the body cover 50 bears upwardly on the center of the bottom of the base flange 42.

In operation when the valve 56 is closed as shown, the vacuum pump withdraws gas from the bellows housing 16, thereby gradually reducing the pressure therein. This causes the evacuated bellows 22 to expand, thereby lowering the plunger 30 on the bottom thereof.

When the descending plunger 30 reaches the upstanding valve stem 60, it opens the valve 56, and gas from the high primary pressure source connected to the inlet 12 passes into the bore 34 on through transverse bore 40 and bore 38 on through the open valve seat 52 into the bellows housing 16. This increases the pressure in the bellows housing, permitting the bellows 22 to contract and raise the plunger 30, whereupon the valve spring 64 recloses the valve.

This operation serves to maintain a constant pressure at the degree set by the adjustment screw 66 throughout wide variations in primary pressure and gas flow rate.

What is claimed is:

1. Aneroid controlled regulator comprising a body having a central bore and an inlet to said bore, a bellows housing secured to said body and having an outlet through said body, an evacuated bellows in said housing, an operating plunger on the bottom of said bellows, a cartridge slidable in said bore, a valve seat at the top of said cartridge, a valve in said cartridge having a valve stem passing through said seat, and a spring pressing said valve against said seat, whereby vacuum applied to said outlet expands said bellows to cause said plunger to engage said stem and open said valve against the pressure of said spring, and an adjustment screw mounted in the bottom of said regulator body to adjust the position of said cartridge with respect to said bellows.

2. Aneroid controlled regulator as claimed in claim 1, in which said evacuated bellows has a stationary mounting in the top of said housing, a cartridge spring is mounted in said bore, and said screw moves said cartridge axially of said body bore toward said stationary mounting against the action of said cartridge spring.

3. Aneroid controlled regulator as claimed in claim 2, in which said bellows mounting comprises a base plate removably sealed at the top of said bellows housing, and said bellows comprises a plunger plate carrying said plunger with an annularly corrugated diaphragm sealed between said base plate and said plunger plate for free floating mounting of said plunger plate in said bellows housing.

No references cited.

ISADOR WEIL, Primary Examiner.